Dec. 29, 1959 L. M. COLLINS 2,919,056
LIQUID MEASURING DEVICE
Filed Feb. 20, 1956
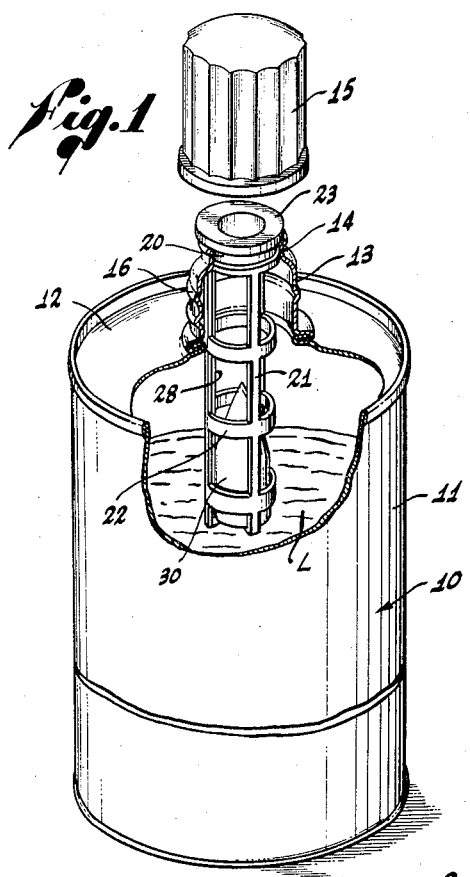
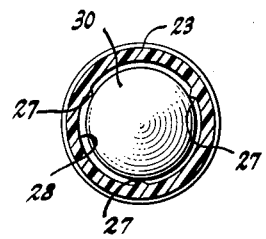
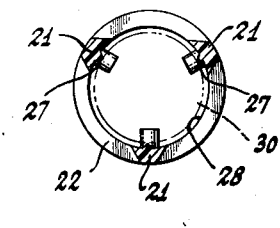
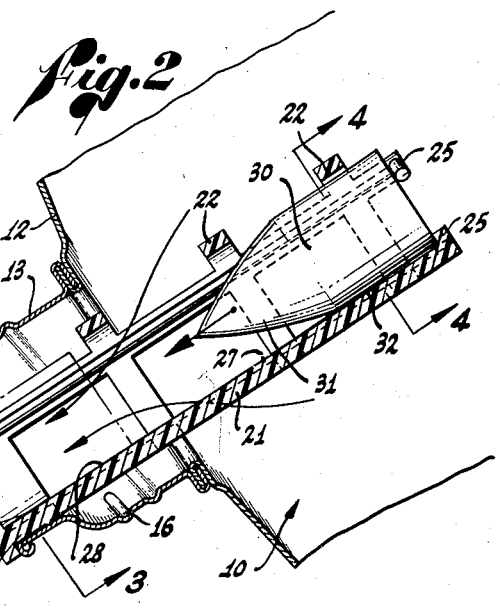
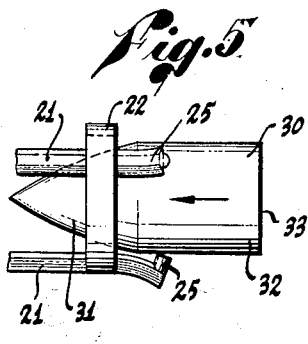
INVENTOR.
LEONARD M. COLLINS
BY
Attorneys

United States Patent Office 2,919,056
Patented Dec. 29, 1959

2,919,056

LIQUID MEASURING DEVICE

Leonard M. Collins, Los Angeles, Calif., assignor to Pressure Dispensers, Inc., Hollywood, Calif., a corporation Application February 20, 1956, Serial No. 566,519

13 Claims. (Cl. 222—477)

This invention relates generally to devices for measuring a quantity of liquid to be dispensed from a container, and more particularly to a device of this kind which is of such simple and economical construction that it may be installed permanently in a container and discarded with the container when the latter is empty. An advantageous use of the invention is in containers for dispensing liquid detergents, but other uses for the invention such as in beverage containers will be apparent to those skilled in the art.

There are at present liquid measuring devices in use for dispensing liquids either from fixed dispensers or from the tops of bottles and containers. However, most of these devices are relatively large and complex, cannot be fitted entirely within the container, and are of such cost that it would not be practical to discard them after a single use.

The present device is adapted to be inserted into the container and remain therein by a press fit of an upper flange in the container mouth. Thus, it can be placed within the container upon its initial filling and remain therein during storage, display and consumer use. It is easily installed, and as will be apparent from the construction thereof is of such low cost that it does not contribute materially to the packaging expense for the product.

Measurement for the amount of liquid dispensed is determined by the transit or falling time of the free falling valve closure member contained within a timing shaft. While normal check valve mechanisms are adapted to close as rapidly as possible, the present device is designed to provide an appreciable delay before the valve member seats so that a predetermined amount of liquid is dispensed from the device before closure. This delay is made of substantial duration by the high drag form of the body for slow falling movement within a liquid, and the elongated length of the timing shaft in which the body falls. Such a simple timing mechanism thus provides for a predetermined amount of liquid to be dispensed from the container, without the necessity of resorting to siphon chambers, complex valving mechanisms, and the like, as are employed in the devices of the prior art.

With the foregoing in mind, it is therefore the major object of this invention to provide a liquid measuring device which is adapted for complete installation within a liquid dispensing container, and is of simple and low cost construction.

A further object of the invention is to provide a liquid measuring device employing a timing shaft, and a relatively slow falling free body for controlling the closure of the container, and hence the quantity of liquid dispensed therefrom.

It is also an object of the invention to provide a liquid measuring device having a valve closure member adapted for free-fall within an elongated timing shaft and of high drag form for a relatively slow fall through the column of liquid.

An additional object of the invention is to provide a liquid measuring device comprisng an elongated outer cage or framework which may be readily installed within the mouth of a container and a free-falling closure member contained therein, which is itself adapted for simple installation within the outer cage.

A further object of the invention is to provide a liquid dispensing device having an outer framework formed with longitudinal stringers disposed cylindrically and having internally formed guide ribs extending therealong for guiding and constraining the valve closure member therein without excessive frictional resistance.

Still another object of the invention is to provide a liquid measuring device having an outer cage or framework formed of resilient plastic material and having a top flange adapted for press fit within the mouth of a container and lower resilient deformable stop fingers for inserting and holding a valve closure member therein.

These and other objects and advantages of the invention will become apparent from the following detailed description of a preferred form thereof, and an inspection of the accompanying drawing in which:

Figure 1 is a perspective view of a typical liquid dispensing container partially cut away to show the installation of an embodiment of the invention therein;

Figure 2 is a longitudinal cross section taken through the preferred embodiment of the invention as it would appear with the dispensing container in an inverted position;

Figure 3 is a cross section taken along the line 3—3 of Figure 2;

Figure 4 is a cross section taken along the line 4—4 of Figure 2; and

Figure 5 is a detail illustrating the assembly of the closure member within the lower end of the outer cage.

Referring now to the drawings and particularly to Figure 1 thereof, the numeral 10 indicates generally a container or can containing a volume of liquid L. Container 10 has a cylindrical side wall 11 closed inwardly at the top by an upper wall 12 which is joined to a short upstanding neck 13. The latter is of tubular form and terminates at an upper mouth 14 through which liquid is dispensed for consumption. Container 10 as illustrated is typical of those in common use for liquid detergents or soaps which are of concentrated strength, and used in relatively small amounts for washing purposes. Shown above container 10 is a cap 15 which may be removably secured to neck 13 by external threads 16 and corresponding internal threads (not shown) in the cap.

In the past it has been common practice to measure the amount of liquid dispensed from the container by using the cap as a measuring cup, but it can be understood that this is not desirable nor convenient. The use of the present invention does away with such a procedure, and causes the desired amount of liquid to be dispensed when the container mouth of the container is merely tipped and inverted below the horizontal, i.e., when the container mouth lies below the longitudinal axis of the container. Each time the container is thus moved an additional equal quantity of liquid will be dispensed. The predetermined amount of liquid which is to be dispensed may, of course, vary depending upon the liquid and its use, and the shape and type of container will likewise vary from that shown. This is to be appreciated in considering the following detailed construction of the preferred embodiment of the invention.

Fitted within the mouth 14 of the container is an elongated cylindrical cage or open framework 20 which extends downwardly through neck 13 and into the body of the container. Framework 20 is formed with a plurality of longitudinal stringers 21 which are joined together by a series of annular connecting bands 22. At the top, stringers 21 are joined with an upper flange 23 which is of a size to fit tightly within container mouth 14. The top portion of flange 23 is enlarged to override the lip of mouth 14 and is also extended inwardly to define an annular valve seat 24 which faces downwardly with the container. It will also be noted that the lowermost connecting band 22 is positioned above the lower ends of stringers 21 and that the latter have short inturned stop fingers 25 formed at the bottoms thereof.

The framework 20 just described is preferably made as an integral molded article of a plastic material having resilient qualities such as polyethylene. Flange 23 is a press or snap fit within mouth 14 and holds the framework firmly in place. To aid in frictional engagement between the flange and the wall of mouth 14, a slight raised bead 26 may be formed on the exterior of the flange. A further refinement of the structure is in the provision of internally raised guide ribs 27 which extend along the inner surfaces of stringers 21. As is best seen in Figures 3 and 4 the ribs 27 serve to provide low friction guide surfaces for a valve closure body 30 which is slidable therealong.

It will be understood from its construction that framework 20 defines an inner elongated cylindrical timing shaft, designated 28, which extends from the surface of valve seat 24 to the lower stop finger 25. Liquid is free to enter shaft 28 through the open side wall of framework 20 and pass forwardly through valve seat 24 for dispensing.

In order to measure the amount of liquid dispensed from container 10 and at the same time control the flow of the liquid, use is made of a free falling valve closure body 30 which is adapted to move along the length of timing shaft 28. Body 30 is preferably of projectile-like form, having an elongated tapered nose portion 32 which is terminated by a flat back wall 33. The maximum diameter of body 30 is such that it has substantial clearance with the bands 22 and is only slightly in contact with the longitudinal guide ribs 27 so that it has true freefalling characteristics. Body 30 is formed of solid material and has a relatively great weight for its size.

As is best seen in Figure 5, body 30 is assembled within framework 20 by resiliently deforming stop fingers 25 and the lower free ends of stringers 21 outwardly. Once body 30 has passed inwardly beyond finger 25 the latter return inwardly to their normal position shown in Figures 1 and 2, and limit downward or rearward movement of the body. This simple assembly of the closure member 30 within framework 20, combined with the easy manner in which the complete device is mounted within the container contributes greatly to its practical and successful use in a throw away container. After container 10 is filled with liquid the framework 20 may be merely dropped in place before cap 15 is put on. Thereafter it will, of course, remain in place during the dispensing life of the container.

The amount of liquid dispensed from container 10 when it is tipped or inverted below the horizontal is controlled by the transit or falling time of body 30 within shaft 28. Normally when container 10 is upright, body 30 is seated on fingers 25 at the bottom of timing shaft 28. When the container is tipped below the horizontal, e.g., as shown in Figure 2, body 30 tends to move forwardly or downwardly towards valve seat 24. Liquid from the container is dispensed through valve seat 24 until body 30 seats thereon as is shown in phantom outline. Because of its pointed nose portion 31, body 30 is self-centering and always seals tightly against seat 24 so that no further liquid can flow from the container so long as it remains tipped.

It will be understood that while the device described functions as a check valve, it is not desired that body 30 close against seat 24 immediately upon tipping of the container since this would result in little or no liquid being dispensed. Such a result is avoided by making timing shaft 28 relatively long and by shaping body 30 so that it falls relatively slowly. In other words, body 30 has a high drag form causing it to fall through the liquid in the container slowly. Considering the shape of body 30 it will be seen that there is an abrupt discontinuity or shoulder at the junction of back wall 33 with central wall portion 32. From a hydrodynamic standpoint this discontinuity in the shape of body 30 causes turbulent fluid flow around the back of the body and the result is that the travel of the body is materially slowed down.

By properly dimensioning the length of timing shaft 28 and the shape of body 30, the amount of liquid dispensed from the container upon each operation of the measuring device can be accurately controlled, and it will be understood that each tipping of the container will result in an additional equal amount being dispensed. While I have shown and described in some detail a preferred embodiment of the invention, it will be understood that modifications of design and construction will be apparent to those skilled in the art. Therefore, I do not wish to be restricted to the foregoing except as defined in the appended claims.

I claim:

1. A liquid measuring device for installation in a top open dispensing container comprising: an elongated cage formed with an open framework adapted to fit downwardly in said container through the mouth thereof, said cage having a plurality of guiding ribs formed on the interior surface thereof, and having an upper flange seating tightly within said mouth and formed with an annular valve seat thereon, said cage defining a longitudinal timing shaft of substantial length; and a closure member fitted loosely within said cage for free falling continuous movement within said timing shaft upon inversion of said container mouth below the horizontal and being guided and constrained for movement towards and away from said valve seat by said framework, said member having a high drag form for slow fall through said liquid whereby when said container mouth is inverted below the horizontal said member moves continuously towards said seat and a measured volume of said liquid is dispensed from said container in advance of the engagement of said member on said seat.

2. A liquid measuring device for installation in a top open dispensing container comprising: an elongated cage formed with an open framework adapted to fit downwardly in said container through the mouth thereof, said cage having a plurality of guiding ribs formed on the interior surface thereof, and having an upper flange seating tightly within said mouth and formed with an annular valve seat thereon, said cage defining a longitudinal timing shaft of substantial length; and a closure member fitted loosely within said cage for free falling continuous movement within said timing shaft upon inversion of said container mouth below the horizontal and being guided and constrained for movement towards and away from said valve seat by said framework, said member having a discontinuity in the lower surface portion thereof to provide a high drag form for slow fall through said liquid, whereby when said container mouth is inverted below the horizontal said member moves continuously towards said seat and a measured volume of said liquid is dispensed from said container in advance of the engagement of said member on said seat.

3. A liquid measuring device for installation in a top open dispensing container comprising: an elongated cylindrical cage formed with an open framework of longitudinal stringers and annular connecting bands adapted to fit downwardly in said container through the mouth thereof and defining a longitudinal timing shaft of substantial length, said framework having at least one guiding rib extending along the interior surface thereof; an upper flange formed on said cage and adapted to fit tightly within said mouth, said flange having a downwardly facing annular valve seat therein; and a closure member fitted loosely within said cage for free falling continuous movement within said timing shaft upon inversion of said container mouth below the horizontal and being guided and constrained for movement towards and away from said valve seat by said framework, said member having a high drag form for slow fall through said liquid whereby when said container mouth is inverted below the horizontal said member moves continuously towards said seat and a measured volume of said liquid is dispensed from said container in advance of the engagement of said member on said seat, said measuring device being substantially contained within said container when said container is in a non-inverted position.

4. A liquid measuring device for installation in a top open dispensing container comprising: an elongated cylindrical cage formed with an open framework of longitudinal stringers and annular connecting bands adapted to fit downwardly in said container through the mouth thereof and defining a longitudinal timing shaft of substantial length, said framework having at least one guiding rib extending along the interior surface thereof; an upper flange formed on said cage and adapted to fit tightly within said mouth, said flange having a downwardly facing annular valve seat thereon; and a closure member fitted loosely within said cage for free falling continuous movement within said timing shaft upon inversion of said container mouth below the horizontal and being guided and constrained for movement towards and away from said valve seat by said framework, said member having a high drag form for slow fall through said liquid whereby when said container mouth is inverted below the horizontal said member moves continuously towards said seat and a measured volume of said liquid is dispensed from said container in advance of the engagement of said member on said seat, said measuring device being substantially contained within said container when said container is in a non-inverted position.

5. A liquid measuring device for installation in a top open dispensing container comprising: an elongated cylindrical cage formed with an open framework of longitudinal stringers and annular connecting bands adapted to fit downwardly in said container through the mouth thereof and defining a longitudinal timing shaft of substantial length; an upper flange formed on said cage and adapted for press fit within said mouth, said flange having a downwardly facing annular valve seat thereon; a closure member fitted loosely within said cage for free falling continuous movement within said timing shaft upon inversion of said container mouth below the horizontal and being guided and constrained by said framework for continuous movement towards and away from said valve seat; and a plurality of resilient stop fingers formed at the lower ends of said cage stringers, said fingers being deformable outwardly to fit said closure member within said shaft and springable inwardly to thereafter limit the downward movement of said member.

6. A liquid measuring device for installation in a top open dispensing container comprising: an elongated cylindrical cage formed with an open framework of resilient longitudinal stringers and annular connecting bands adapted to fit downwardly in said container through the mouth thereof and defining a longitudinal timing shaft of substantial length, said stringers being formed with guide ribs extending along the interior surface thereof and said lowermost annular band being spaced away from the ends of said stringers; an upper flange formed on said cage and adapted for press fit within said mouth, said flange having a downwardly facing annular valve seat thereon; a closure member fitted loosely within said cage for free falling movement within said timing shaft and being guided and constrained by said framework for movement towards and away from said valve seat; and a plurality of resilient stop fingers formed at the lower ends of said cage stringers, said fingers being deformable outwardly to fit said closure member within said shaft and springable inwardly to thereafter limit the downward movement of said member.

7. A liquid measuring device for installation in a top open dispensing container comprising: an elongated cylindrical cage formed with an open framework of longitudinal stringers and annular connecting bands adapted to fit downwardly in said container through the mouth thereof and defining a longitudinal timing shaft of substantial length; an upper flange formed on said cage and adapted to fit tightly within said mouth, said flange having a downwardly facing annular valve seat thereon; a relatively heavy closure member fitted loosely within said cage for free falling continuous movement within said timing shaft upon inversion of said container mouth below the horizontal and being guided and constrained for continuous movement towards and away from said valve seat by said framework, said member being formed of a projectile-like shape with an inwardly-tapered upper nose portion shaped to center within and make sealing engagement with said seat, a cylindrical center portion, and a flat bottom wall joining said center portion at an abrupt shoulder to provide a high drag form for slow fall through said liquid, whereby when said container mouth is inverted below the horizontal said member moves continuously towards said seat and a measured volume of said liquid is dispensed from said container in advance of the engagement of said member on said seat; and a plurality of resilient stop fingers formed at the lower ends of said cage stringers, said fingers being deformable outwardly to fit said closure member within said shaft and springable inwardly to thereafter limit the downward movement of said member.

8. A liquid-measuring device for installation in a container having a top opening dispensing mouth which comprises: an elongated cage formed within an open framework adapted to extend downwardly from said dispensing mouth into said container, said cage defining a longitudinal timing shaft of substantial length; a closure member fitted loosely within said cage for free fall and continuous movement within said timing shaft upon inversion of said container mouth below the horizontal, the closure member having a high drag form for slow fall through said liquid whereby when said container mouth is inverted below the horizontal said member moves continuously toward said mouth and a measured volume of said liquid is dispensed from said container prior to the engagement of said closure member with said mouth whereby to prevent any further dispensing of liquid; and a plurality of spaced resilient stop fingers formed at the lower end of the open framework, said fingers being deformable outwardly to fit said closure member within said framework, and springable inwardly to thereafter limit the downward movement of said member.

9. A liquid measuring device for installation in a top open dispensing container comprising: an elongated slotted shell adapted to fit downwardly in said container through the mouth thereof, said shell having a plurality of guiding ribs extending in a direction along the interior thereof, said shell defining a longitudinal timing shaft of substantial length; and a closure member fitted within said shell for free falling continuous movement within said timing shaft and being guided and constrained by said shell for continuous movement toward and away from said container mouth.

10. The liquid measuring device of claim 9 wherein said closure member has a high drag form for slow fall through said liquid in said container.

11. A liquid measuring device for installation in a top open dispensing container comprising: an elongated open framework adapted to fit downwardly in said container through the opening thereof, said framework having a plurality of guiding ribs extending in a direction along the interior thereof, said framework having a longitudinal timing shaft of substantial length; and a closure member fitted within said framework for free falling continuous movement within said timing shaft and being guided and constrained by said framework for continuous movement toward and away from said container mouth.

12. A liquid measuring device for installation in a top opening dispensing container comprising: an elongated open framework adapted to fit downwardly in said container through the mouth thereof, said framework defining a longitudinal timing shaft of substantial length; a closure member fitted within said framework for free falling continuous movement within said timing shaft and being guided and constrained by said framework for continuous movement toward and away from said container mouth; and a plurality of resilient stop fingers formed at the lower end of said open framework, said fingers being deformable outwardly to fit said closure member within said framework and springable inwardly to thereafter limit the downward movement of said closure member.

13. A liquid measuring device for installation in a top opening dispensing container comprising: an elongated slotted tubular member adapted to fit downwardly in said container through the opening thereof, said tubular member defining a longitudinal timing shaft of substantial length; a closure member fitted within said tubular member for free falling movement within said timing shaft; and a plurality of resilient stop fingers formed at the lower end of said tubular member, said fingers being deformable outwardly to fit said closure member within said tubular member and springable inwardly to thereafter limit the downward movement of said closure member.

References Cited in the file of this patent

UNITED STATES PATENTS

| | | |
|---|---|---|
| 527,726 | Schneider et al. | Oct. 16, 1894 |
| 777,425 | Langstaff | Dec. 13, 1904 |
| 925,001 | Langstaff | June 15, 1909 |
| 936,334 | Marcuse | Oct. 12, 1909 |
| 1,990,226 | Eisemann et al. | Feb. 5, 1935 |
| 2,168,050 | Slipikas | Aug. 1, 1939 |
| 2,529,554 | Katzmann | Nov. 14, 1950 |